(12) United States Patent
Yamaguchi et al.

(10) Patent No.: US 6,565,213 B1
(45) Date of Patent: May 20, 2003

(54) PROJECTION APPARATUS

(75) Inventors: Makoto Yamaguchi, Kanagawa (JP); Susumu Yamada, Chiba (JP); Akira Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 09/629,723

(22) Filed: Jul. 31, 2000

(30) Foreign Application Priority Data

Jul. 29, 1999 (JP) .......................................... 11-215839

(51) Int. Cl.⁷ .......................... G03B 21/00; G03B 21/14
(52) U.S. Cl. .......................................... 353/33; 353/119
(58) Field of Search ............................... 353/119, 30, 33, 353/34, 31, 60, 81, 84, 100, 101, 122

(56) References Cited

U.S. PATENT DOCUMENTS

| | | | | |
|---|---|---|---|---|
| 5,676,442 A | * | 10/1997 | Fujimori | 353/119 |
| 5,743,611 A | * | 4/1998 | Yamaguchi et al. | 353/31 |
| 5,816,675 A | * | 10/1998 | Brice et al. | 353/31 |
| 5,975,704 A | * | 11/1999 | Basey | 353/20 |
| 6,095,653 A | * | 8/2000 | Yajima | 353/33 |
| 6,106,120 A | * | 8/2000 | Menard | 353/119 |
| 6,322,217 B1 | * | 11/2001 | Fujimori et al. | 353/31 |
| 6,375,328 B2 | * | 4/2002 | Hashizume et al. | 353/30 |

FOREIGN PATENT DOCUMENTS

JP H3-296735 * 12/1991 ............ G03B/33/12

OTHER PUBLICATIONS

Translation of Japanese Pulbished Unexamined (Kokai) patent application No. H3–296735, Oct. 28, 2002, U.S. patent and Trademark Office: Translations Branch.*

* cited by examiner

Primary Examiner—Alan A. Mathews
Assistant Examiner—Andrew Sever
(74) Attorney, Agent, or Firm—Jay H. Maioli

(57) ABSTRACT

A projection apparatus includes a prism holder for holding a synthesizing prism, the prism holder including a first positioning portion and being positioned and fixed to one end plane and the other end plane of the synthesizing prism opposite to each other, except for incidence planes of the synthesizing prism on which respective color light beams are incident and an outgoing plane of the synthesizing prism for outputting a synthesized light flux to the side of a projection optical unit, and a lens holder for holding the prism holder and a projection lens, the lens holder including a second positioning portion which is fitted to the first positioning portion of the prism holder to make positioning and fixing. Thus, assembling can be made with accuracy and without fail while positioning is made to the optical modulation element, the synthesizing prism, and the projection lens.

13 Claims, 10 Drawing Sheets

1004,1005,1006

1004,1005,1006

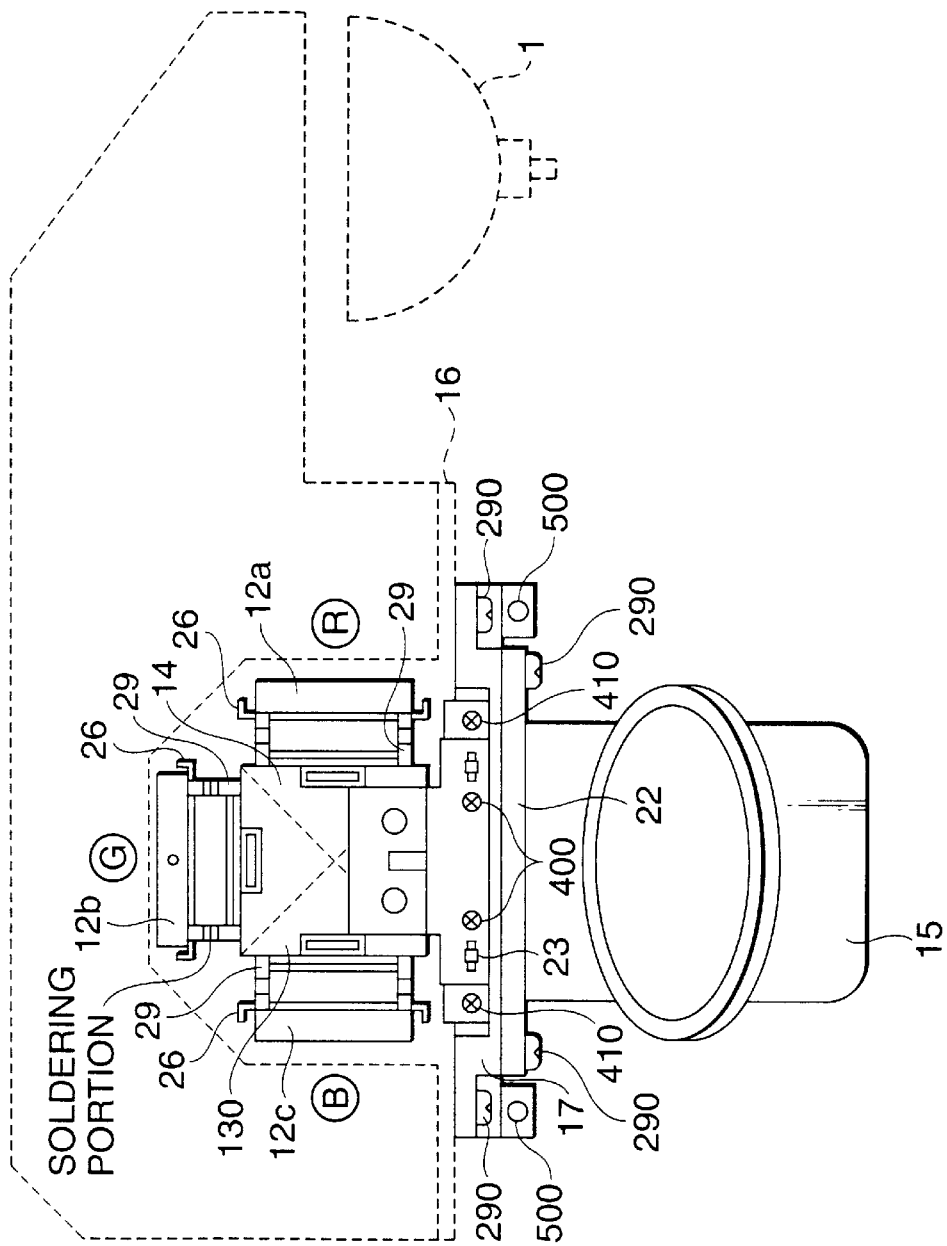

PROJECTION APPARATUS

BACKGROUND OF THE INVENTION

1. Field of the Invention

The present invention relates to a projection apparatus, and particularly to a projection apparatus including a positioning and fixing structure of an optical prism holder and lens holder.

2. Description of the Related Art

In a projection apparatus using, for example, a plurality of light valves of liquid crystal, a white light beam is separated into color light beams of red, green and blue of the three primary colors, the color light beams are image modulated by the liquid crystal light valves, and next, the respective color light beams are synthesized to generate a light flux, and then, it is projected onto a screen by a projection lens.

FIG. 1 is a plan view showing a conventional projection apparatus. Liquid crystal panels 1001, 1002 and 1003 are provided on three planes of a prism 1000, respectively. The liquid crystal panel 1001 is a transmission type optical modulation element for green (G), the liquid crystal panel 1002 is a transmission type optical modulation element for blue (B), and the liquid crystal panel 1003 is a transmission type optical modulation element for red (R).

These liquid crystal panels 1001, 1002, and 1003 are positioned and fixed to the prism 1000 by stages 1004, 1005 and 1006, respectively. This prism 1000 is fixed at the side of a projection lens holder 1014 of a projection lens 1010.

FIGS. 2 to 4 show structural examples of the stages 1004 to 1006.

Positioning (registration) of the three liquid crystal panels 1001, 1002 and 1003 is performed in such a manner that one liquid crystal panel (here, the liquid crystal panel 1001 for green) is mechanically set so that the center of the liquid crystal panel 1001 can be located at the center of the prism 1000 and the projection lens 1010, and then, simple stages with adjustable X, Y, Z and θ axes for the other two liquid crystal panels 1002 and 1003 are finely adjusted with the liquid crystal panel 1001 for green as a basis, and while the Z axis is adjusted, positioning is performed so that images of the three liquid crystal panels 1001, 1002 and 1003 of red, green and blue overlap on a screen. At this time, accuracy of ⅓ pixel to 1 pixel is required for the positioning accuracy of the three liquid crystal panels.

Japanese Patent No. 2714939 proposes a method in which a polarizing plate is stuck onto each of three planes of a cross dichroic prism, a jig is used to position a liquid crystal panel on the polarizing plate, and the liquid crystal panel is directly fixed to the prism.

In the foregoing liquid crystal projection apparatus, the simple adjusting stages 1004 to 1006 are prepared correspondingly to each of the liquid crystal panels, the stages are fixed to the cross dichroic prism, and the adjustment of positioning is performed. Thus, there have been problems as follows:

(1) Since the stages for adjustment are provided for the respective liquid crystal panels of red, green and blue, the number of parts becomes large.

(2) After adjustment with respect to the X, Y, θ, and Z axes is performed, the stage is fixed by a screw or the like so that it does not move. When the screw is tightened to fix, the stage slightly moves and causes a positional deviation of the liquid crystal panel.

(3) if an attempt is made to adjust the positional relation of the respective liquid crystal panels with accuracy, an adjustment mechanism of the stage becomes complicated, and adjustment axes are increased, so that an optical system becomes large.

(4) It becomes difficult to secure a gap between the outgoing side of the liquid crystal panel and the prism plane, so that air comes not to pass between the liquid crystal panel and the prism, cooling efficiency of the liquid crystal panel is poor, and the liquid crystal panel comes not to function correctly.

(5) Since the stage is constructed such that it is fixed by being always pulled by a spring or the like in one direction, it is weak against shock, and the positional deviation of the liquid crystal panel is apt to occur by vibration, shock, or the like.

(6) When the respective liquid crystal panels for red, green and blue are positioned with higher accuracy, it takes a time to position the three liquid crystal panels.

In the method of Japanese Patent No. 2714939, the polarizing plate stuck on the prism can not be cooled, so that its temperature becomes high by light from a light source (lamp), the polarizing function of the polarizing plate is lost, and the optical modulation at the liquid crystal panel becomes impossible.

Besides, if the liquid crystal panel is directly bonded onto the polarizing plate by an adhesive, when the adhesion is peeled for replacement of parts in the case where a defect occurs in the polarizing plate, the liquid crystal panel or the like, the parts of the polarizing plate and the liquid crystal panel are damaged, and usable parts are also damaged and become wasted.

Then, the present invention has been made to solve the above problems and an object thereof is to provide a projection apparatus which adopts a simple structure and can be assembled, while positioning of an optical modulation element, a synthesizing prism and a projection lens is made with accuracy and without fail.

SUMMARY OF THE INVENTION

According to a first aspect of the present invention, a projection apparatus includes a light source, separation optical means for color separating a light beam from the light source into a plurality of color light beams, a plurality of transmission type optical modulation elements for modulating the separated color light beams, synthesis optical means for generating a light flux by synthesizing the respective color light beams modulated by the optical modulation elements, and projection optical means for projecting the synthesized light flux, wherein the projection apparatus further comprises a prism holder for holding a synthesizing prism as the synthesis optical means, the prism holder including a first positioning portion, and being positioned and fixed to one end plane and the other end plane of the synthesizing prism opposite to each other, except for incidence planes of the synthesizing prism on which the respective color light beams are incident and an outgoing plane of the synthesizing prism for outputting the synthesized light flux to the side of the projection optical means, and a lens holder for holding the prism holder and a projection lens as the projection optical means, the lens holder including a second positioning portion which is fitted to the first positioning portion to make positioning and fixing.

The prism holder holds the synthesizing prism as the synthesis optical means. The prism holder includes the first positioning portion, and is positioned and fixed to the one end plane and the other end plane of the synthesizing prism opposite to each other, except for the incidence planes of the synthesizing prism on which the respective color light beams are incident and an outgoing plane of the synthesizing prism for outputting the synthesized light flux to the side of the projection optical means.

The lens holder holds the projection lens as the projection optical means. The lens holder includes the second positioning portion which is fitted to the first positioning portion of the prism holder to make positioning and fixing.

By this, the prism holder is positioned to the one end plane and the other end plane of the prism and can fix the synthesizing prism. The second positioning portion of the lens holder can be fixed while positioning is made, by using and fitting the first positioning portion of the prism holder.

Like this, although the structure is simple, the lens holder and the prism holder, and the projection lens and the synthesizing prism can be fixed and assembled while positioning is made without fail.

According to a second aspect of the present invention, in the foregoing projection apparatus, the first positioning portion of the prism holder includes a positioning hole, the second positioning portion of the lens holder includes a positioning pin which is inserted in the positioning hole to position the prism holder with respect to the lens holder, and the lens holder and the prism holder are fixed by screwing after positioning.

The first positioning portion of the prism holder includes the positioning hole, and the second positioning portion of the lens holder includes the positioning pin which is inserted in the positioning hole to position the prism holder with respect to the lens holder. By this, by inserting the positioning pin in the positioning hole, the prism holder and the lens holder can be easily positioned. The lens holder and the prism holder are fixed by screwing after positioning.

According to a third aspect of the present invention, the projection apparatus of the first aspect includes a first fixing member which is disposed opposite to one of the three incidence planes on which the color light beams of the synthesizing prism are incident, is bonded to the one end plane and the other end plane of the synthesizing prism, and includes an opening portion through which the color light beams modulated by the optical modulation element pass, and a plurality of ear-shaped protrusions; and a second fixing member which is put into close contact with and is fixed to the first fixing member so that the optical modulation element is fixed to the side of the synthesizing prism, includes an opening portion through which the color light beams modulated by the optical modulation element pass, and a plurality of ear-shaped protrusions, wherein the protrusions of the first fixing member and the protrusions of the second fixing member are fixed by bonding or soldering in a state where the three optical modulation elements are respectively positioned to the three incidence planes of the synthesizing prism on which the color light beams are incident so that the color light beams form the light flux synthesized by the synthesizing prism.

The first fixing member is disposed opposite to one of the three incidence planes, and is bonded to the one end plane and the other end plane of the synthesizing prism. The first fixing member includes the opening portion through which the color light beams modulated by the optical modulation element pass, and the ear-shaped protrusions. The second fixing member is put into close contact with and is fixed to the first fixing member so that the optical modulation element is fixed to the side of the synthesizing prism. The second fixing member includes the opening portion through which the color light beams modulated by the optical modulation element pass, and the ear-shaped protrusions.

The protrusions of the first fixing member and the protrusions of the second fixing member are fixed by bonding or soldering in the state where the three optical modulation elements are respectively positioned to the three incidence planes on which the color light beams of the synthesizing prism are incident so that the color light beams reproduce the light flux synthesized by the synthesizing prism.

According to a fourth aspect of the present invention, in the projection apparatus of the third aspect, the adhesive is a photo-curing adhesive.

By using the photo-curing adhesive, bonding can be easily made.

BRIEF DESCRIPTION OF THE DRAWINGS

FIG. 12 is a plan view showing a state where the projection lens and the synthesizing prism are positioned and fixed.

DETAILED DESCRIPTION OF THE INVENTION

Hereinafter, preferred embodiments of the present invention will be described in detail with reference to the accompanying drawings.

The embodiments described below are preferred concrete examples of the present invention, and various preferable technical limitations are added, but the scope of the present invention is not limited to these embodiments unless a statement of limiting the present invention appears in the following explanation.

Figure 1:
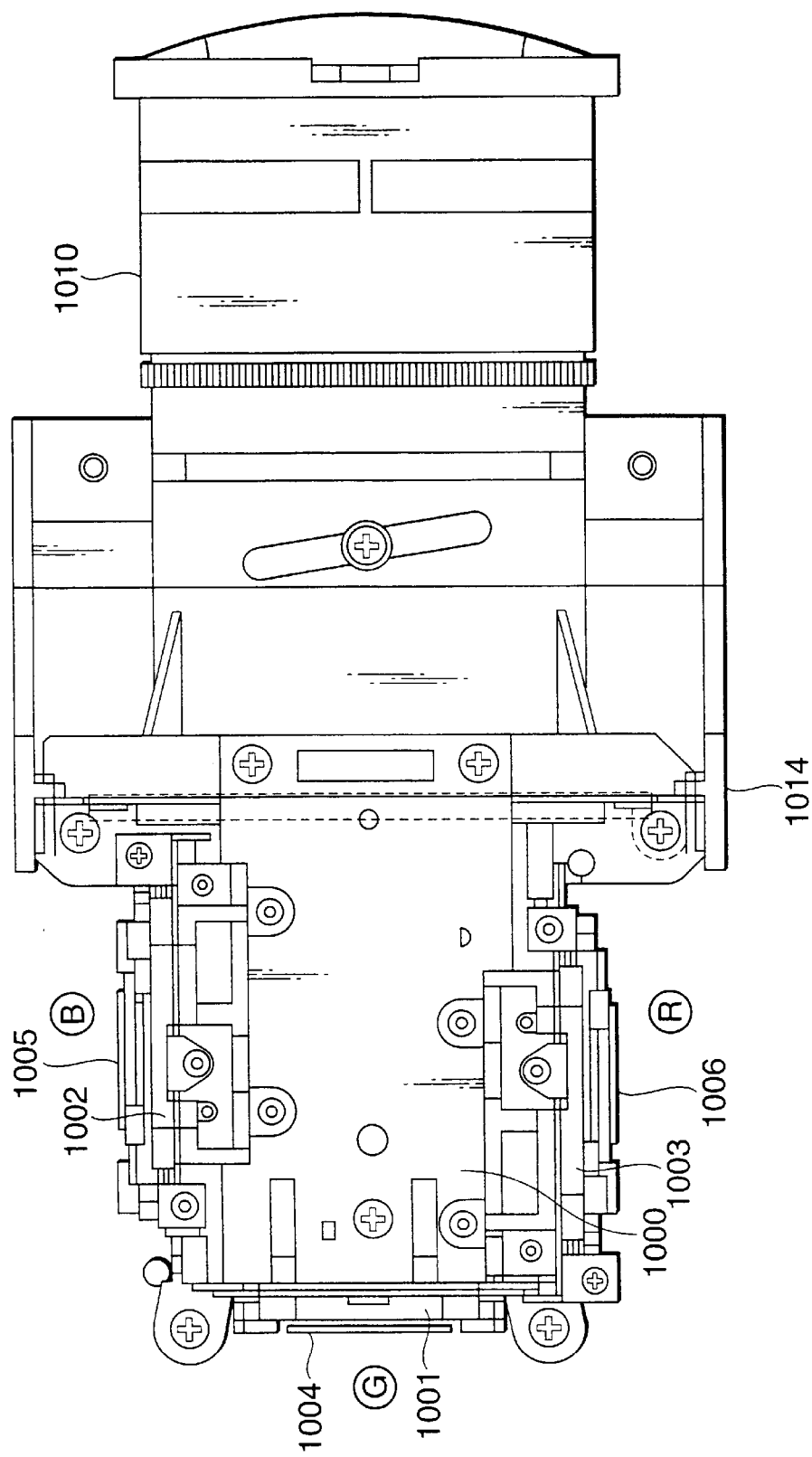
FIG. 1 is a plan view showing an optical unit of a conventional projection apparatus.
Figure 2:
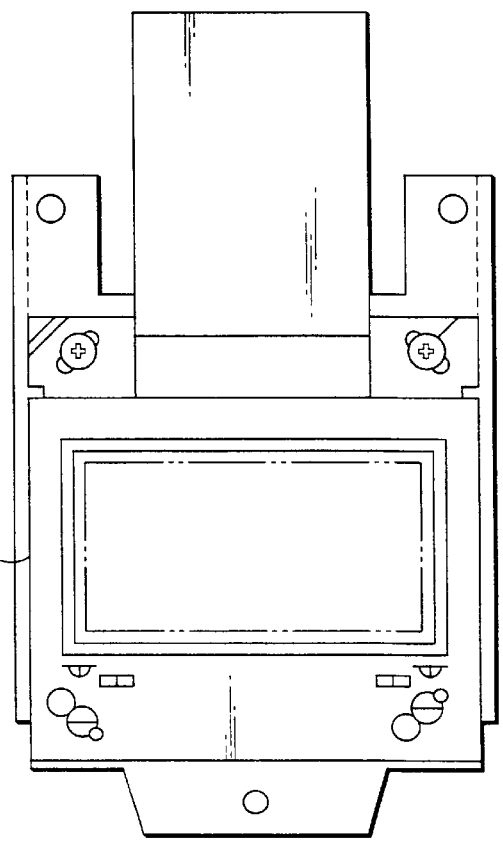
FIG. 2 is a front view showing an example of a mounting bracket of the conventional liquid crystal panel.
Figure 3:
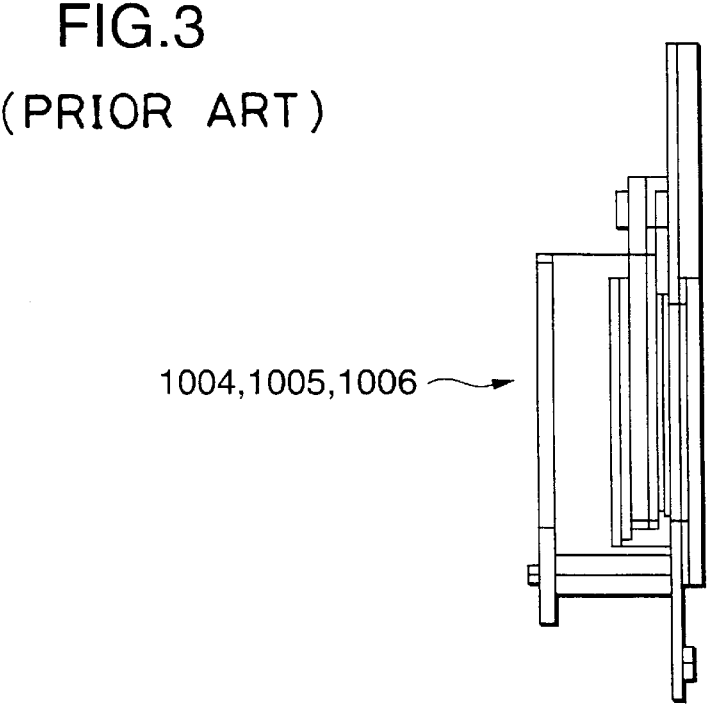
FIG. 3 is a side view showing the mounting bracket of the conventional liquid crystal panel.
Figure 4:
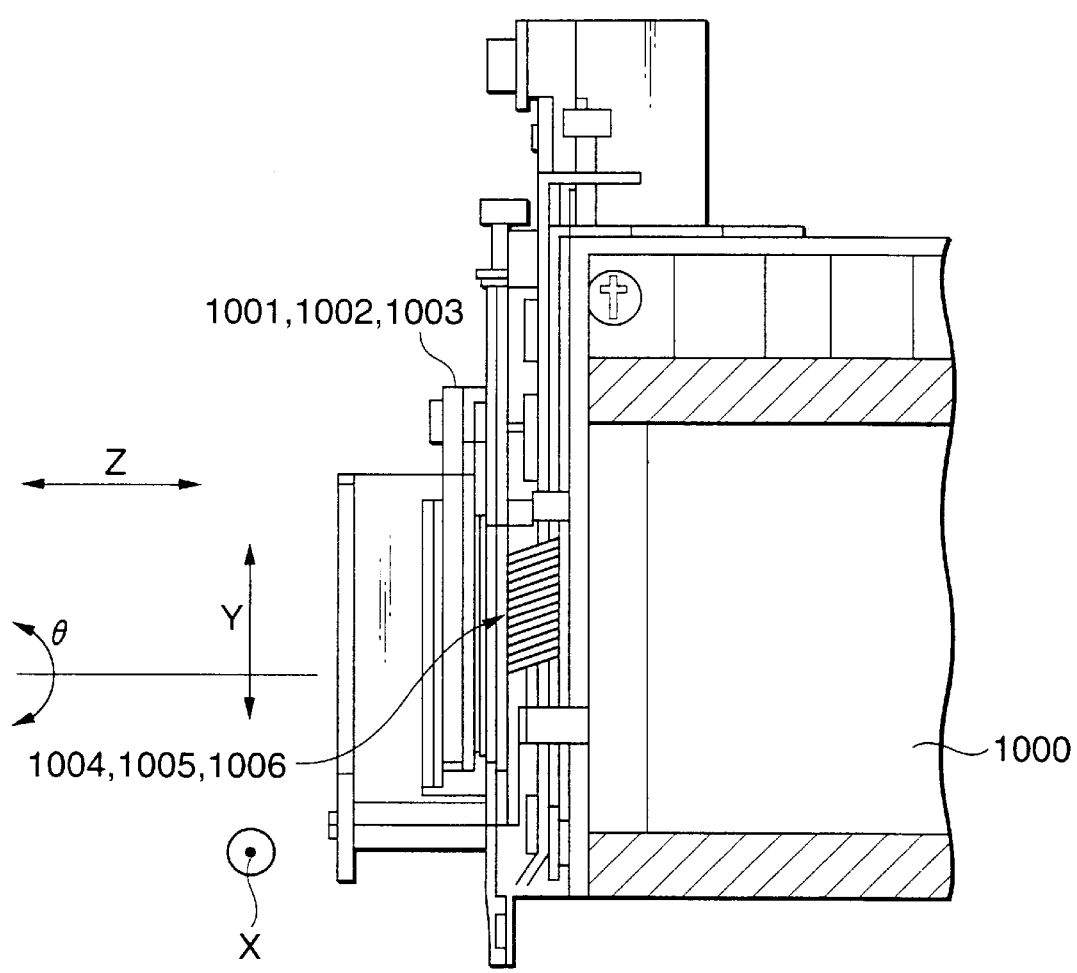
FIG. 4 is a view showing a state where the conventional mounting bracket is fixed to a prism side.
Figure 5:
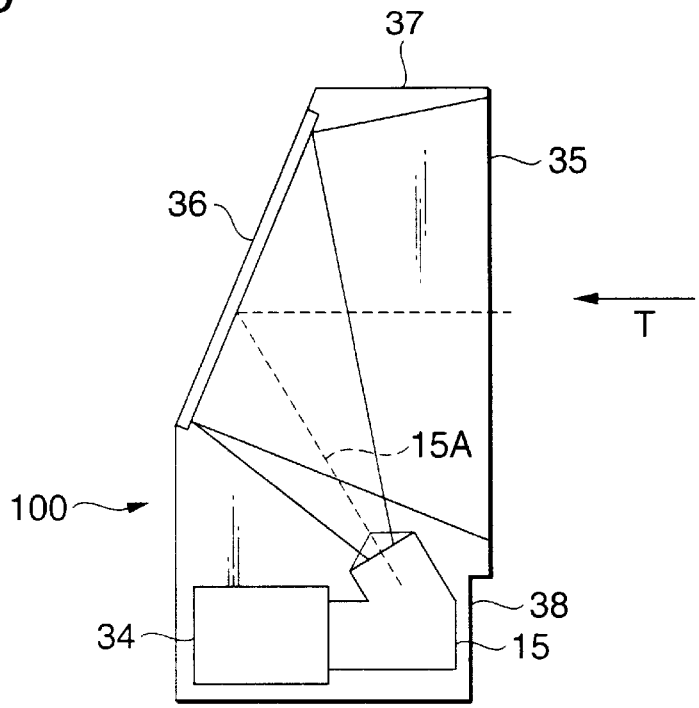
FIG. 5 is a side view showing an internal structure of a projection apparatus of a preferred embodiment of the present invention.
Figure 6:
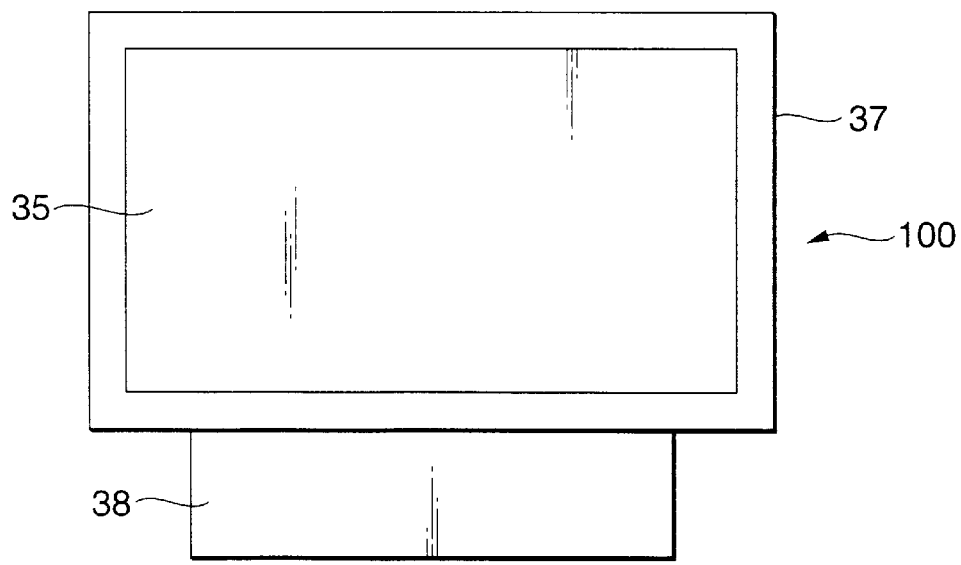
FIG. 6 is a front view of the projection apparatus of FIG. 5.

FIGS. 5 and 6 show preferred embodiments of a projection apparatus of the present invention.

A projection apparatus 100 is a so-called rear projection apparatus using three liquid crystal panels. The projection apparatus 100 includes a housing 37, and an optical unit 34 is accommodated in a lower cabinet 38 of the housing 37. An image 15A projected from a projection lens 15 of the optical unit 34 is turned by a back reflecting mirror 36 and is projected onto a screen 35. An enlarged image projected onto the screen 35 is seen from the direction of arrow T.

Figure 7:
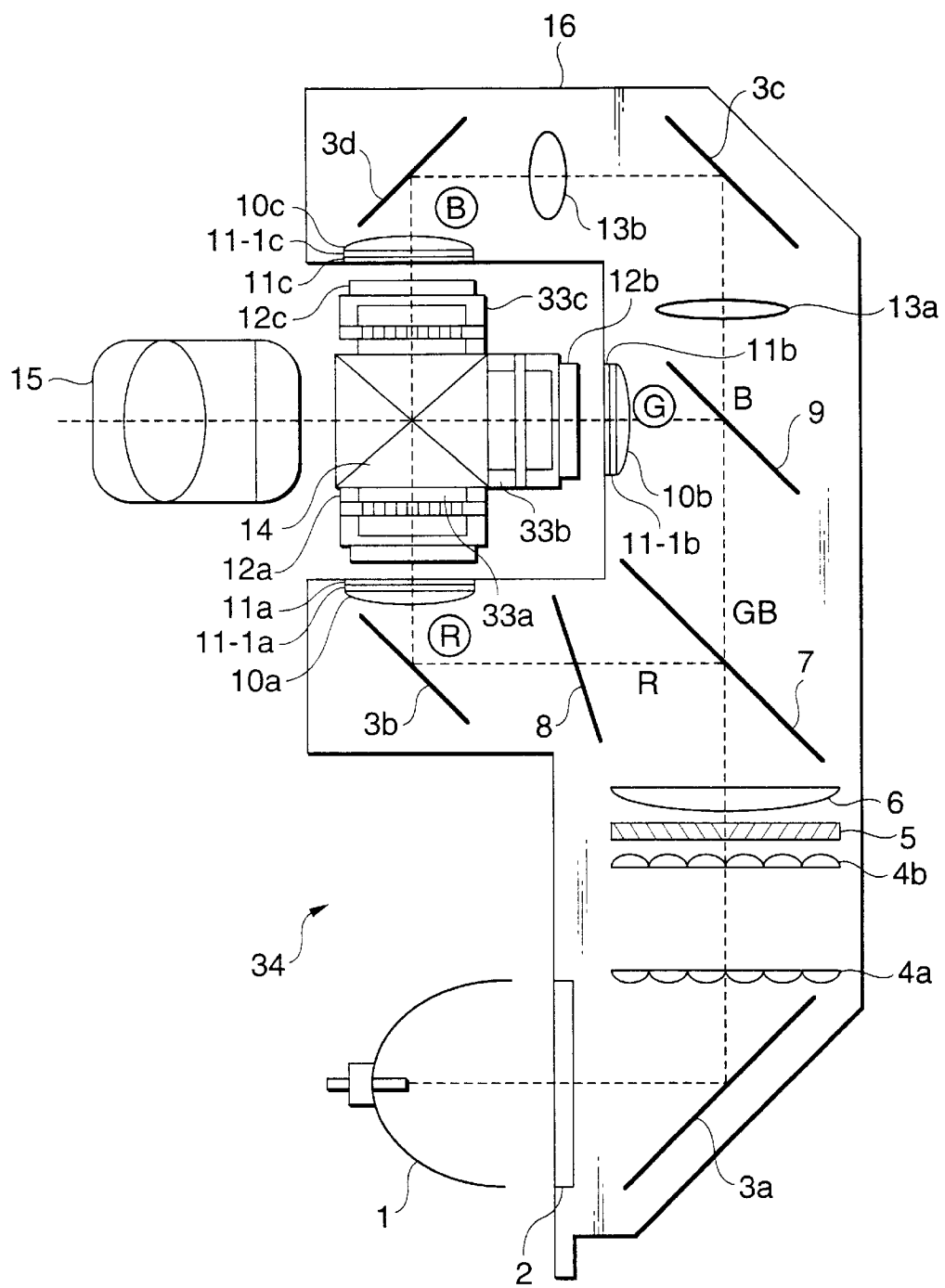
FIG. 7 is a plan view showing an optical structural example of the optical unit of FIG. 5.

FIG. 7 shows a detailed structural example of the optical unit 34 shown in FIG. 5.

In FIG. 7, after illumination light formed by a light source 1 such as a metal halide lamp passes through a cut filter 2 for blocking ultraviolet rays and infrared rays, its course is changed by a reflecting mirror 3a by 90°, it is transmitted through lens arrays 4a and 4b, and enters a prism polarization converting element 5, so that it is separated to a P wave and an S wave.

The P wave is transmitted through the prism, and the S wave is reflected by the prism plane and is further reflected by a reflecting film formed at an adjacent prism, and travels toward a main condenser lens 6. At this time, the S wave is converted to the P wave by a half-wave plate between the prism polarization converting element 5 and the main condenser lens 6.

The P wave transmitted through the prism and the P wave of the converted S wave are condensed by the main condenser lens 6, and are incident on a first dichroic mirror 7. The incident illumination light is color separated by the first dichroic mirror 7, a red (R) light beam is reflected, and a green (G) light beam and a blue (B) light beam are transmitted.

The red (R) light beam, which was color separated and was reflected by the first dichroic mirror 7, is transmitted through a red filter 8, is reflected by a reflecting mirror 3b, is further condensed by a condenser lens 10a, is transmitted through a polarizing plate 11-1a bonded to the condenser lens 10a and a half-wave plate 11a, and illuminates a liquid crystal panel 12a. The liquid crystal panel 12a for red is driven on the basis of a red image signal supplied from a driving circuit (not shown) and light modulation is performed through transmission of red.

On the other hand, the green and blue light beams G and B transmitted through the first dichroic mirror 7 are further color separated by a second dichroic mirror 9. The green (G) light beam is reflected and is incident on a condenser lens 10b, is further condensed by a condenser lens 10b, is transmitted through a polarizing plate 11-1b bonded to the condenser lens 10b and a half-wave plate 11b, and illuminates a liquid crystal panel 12b. The liquid crystal panel 12b for green is driven on the basis of a green image signal supplied from a driving circuit (not shown) and light modulation is performed through transmission of green.

The blue (B) light beam transmitted through the second dichroic mirror 9 is transmitted through a relay lens 13a, is turned by a reflecting mirror 3c by 90°, is incident on a relay lens 13b, is transmitted through the lens, is further rotated by a reflecting mirror 3d by 90°, is incident on a condenser lens 10c, is further condensed by the condenser lens 10c, is transmitted through a polarizing plate 11-1c bonded to the condenser lens 10c and a half-wave plate 11c, and illuminates a liquid crystal panel 12c. The liquid crystal panel 12c for blue is driven on the basis of a blue image signal supplied from a driving circuit (not shown) and light modulation is performed through transmission of blue.

The light beams (illumination light beams) transmitted through the liquid crystal panel 12a for red, the liquid crystal panel 12b for green, and the liquid crystal panel 12c for blue on the basis of the driving signal are transmitted through the polarizing plates 11-1a, 11-1b, and 11-1c bonded to the respective prism planes of red, green and blue of a cross dichroic prism 14 and the half-wave plates 11a, 11b and 11c, and further color magnification correcting lenses 33a, 33b and 33c, and are incident on the cross dichroic prism 14.

The respective red, green and blue light beams incident on the cross dichroic prism 14 are reflected (green beam is transmitted) by reflecting films of the prism planes formed to cross each other, are color synthesized, are enlarged by a projection lens 15, and are projected onto a screen 35 fixed to the housing 37 of FIG. 5.

The half-wave plates 11a, 11b and 11c at the incident side function in such a manner that the phase of an illumination light beam (P wave in the horizontal direction) is changed and the illumination light beam is made incident on the liquid crystal panel from the direction of angle of 45° with respect to the horizontal direction of the liquid crystal panel, so that light leaking from the liquid crystal panel is reduced, the contrast of the liquid crystal panel is raised, and the image quality is improved. Since a light beam at the time when an illumination light beam goes out after twisted through the liquid crystal panel by 90°, so-called outgoing light beam (S wave) is tilted by 45° with respect to the horizontal direction of the liquid crystal panel, the half-wave plate at the outgoing side of the liquid crystal panel changes its phase to the vertical direction, makes the outgoing light beam vertically incident on the polarizing plates 11-1a, 11-1b, and 11-1c at the outgoing side of the liquid crystal panel, makes the light beam the same S wave (vertical direction), and makes the light beam incident on the cross dichroic prism.

When light beams are transmits through a prism and a projection lens, their enlargement ratios are slightly different due to the red, green and blue wavelengths. The color magnification correcting lenses 33a, 33b and 33c correct the enlargement ratios.

Next, a mounting structure of the cross dichroic prism (hereinafter referred to as a synthesizing prism) 14 and the three liquid crystal panels 12a, 12b and 12c will be described with reference to FIG. 8.

The synthesizing prism 14 includes one end plane 130, the other end plane 140, an outgoing plane 150, and three incidence planes 160, 170, and 180. The one end plane 130 and the other end plane 140 are planes orthogonal to the outgoing plane 150, and the incidence planes 160, 170 and 180.

The color magnification correcting lens 33a, the polarizing plate 11-1a, and the half-wave plate 11a are stuck on the incidence plane 180 of the synthesizing prism 14. In the same way, the color magnification correcting lens 33b, the polarizing plate 11-1b, and the half-wave plate 11b are stuck on the incidence plane 170. The color magnification correcting lens 33c, the polarizing plate 11-1c, and the half-wave plate 11c are stuck on the incidence plane 160.

The outgoing plane 150 is a plane opposite to the projection lens 15, and a synthesized light flux L travels from the outgoing plane 150 to the side of the projection lens 15.

The incidence plane 170 is a plane on which a green light flux after modulation is incident, the incidence plane 160 is a plane on which a blue light flux after modulation is incident, and the incidence plane 180 is a plane on which a red light flux after modulation is incident.

Figure 8:
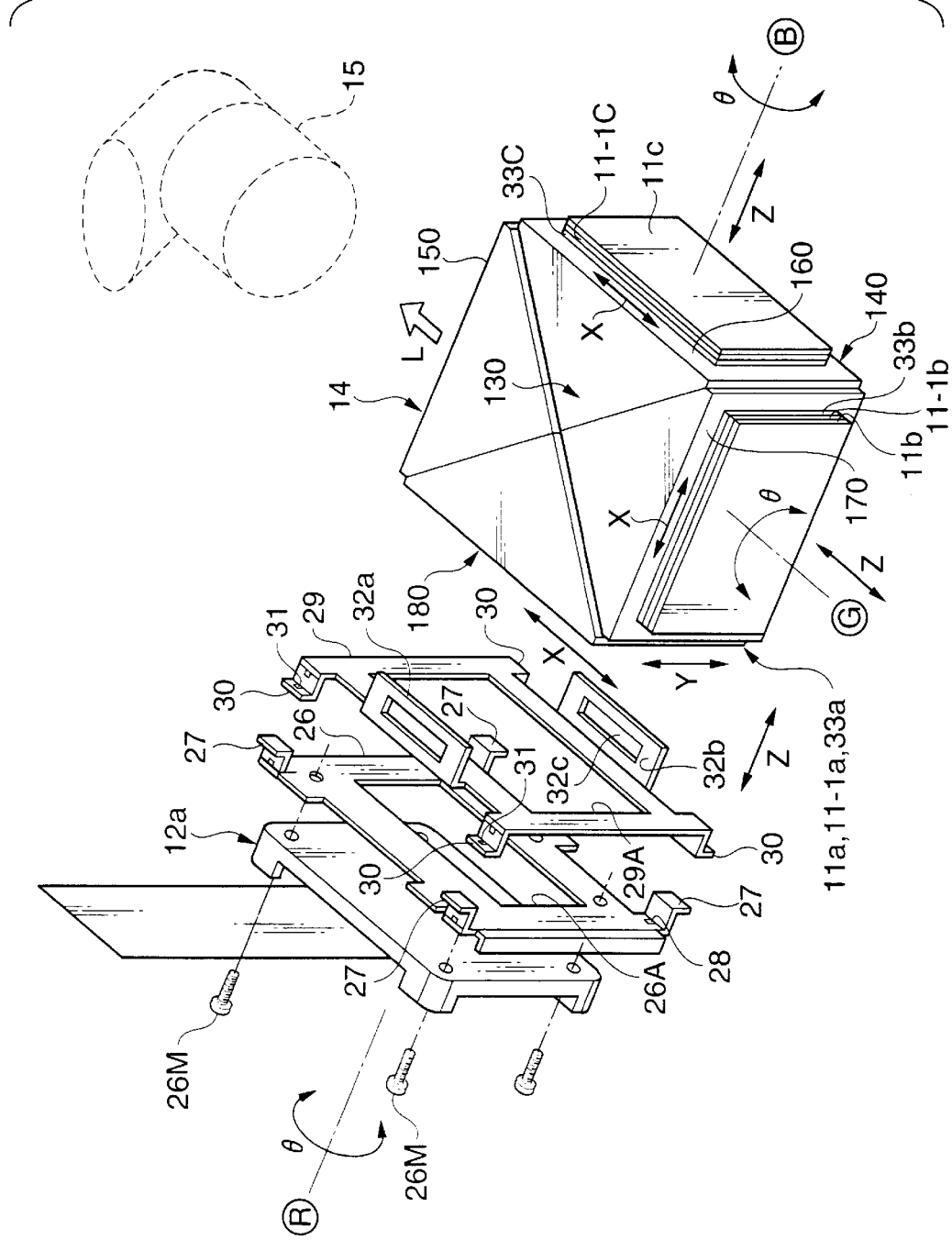
FIG. 8 is a perspective view showing an attachment structural example of a synthesizing prism and a liquid crystal panel.

The corresponding liquid crystal panels 12a, 12b and 12c are fixed to the respective incidence planes 180, 170 and 160 by using a liquid crystal panel fixing bracket 29 as a first fixing member and a liquid crystal panel mounting bracket 26 as a second fixing member as shown in FIG. 8.

The example of FIG. 8 shows a structure where the liquid crystal panel 12a for red is representatively fixed to the incidence plane 180.

The liquid crystal panel 12a is fixed to the liquid crystal panel mounting bracket 26 by, for example, four screws 26M. The liquid crystal panel mounting bracket 26 includes, for example, four ear-shaped protrusions 27. A hole 28 is provided in each of the ear-shaped protrusions 27. The liquid crystal panel mounting bracket 26 is a rectangular or square metal plate, and a rectangular opening portion 26A is formed at the center of the liquid crystal panel mounting bracket 26. This opening portion 26A has almost the same size as a display portion of the liquid crystal panel 12a.

The liquid crystal panel fixing bracket 29 has, for example, four ear-shaped protrusions 30, and a hole 31 is formed in each of the ear-shaped protrusions 30. This protrusion 30 is located at a position corresponding to the protrusion 27 of the liquid crystal panel mounting bracket 26. In the state where the protrusion 30 of the liquid crystal panel fixing bracket 29 is joined to the protrusion 27 of the liquid crystal panel mounting bracket 26, they can be fixed by, for example, a photo-curing adhesive or soldering.

As the photo-curing adhesive, for example, a UV adhesive (ultraviolet ray curing resin) can be used.

The liquid crystal panel fixing bracket 29 includes two bonding portions 32a and 32b at the center portion. The bonding portions 32a and 32b include respectively square holes 32c. The bonding portion 32a is located at the side of the one end plane 130 of the synthesizing prism 14, and the bonding portion 32b is located at the side of the other end plane 140 of the synthesizing prism 14.

The shape of the protrusion 30 of the liquid crystal panel fixing bracket 29 is the same as that of the protrusion 27 of the liquid crystal panel mounting bracket 26, and the surface area is small. This structure is adopted to obtain such effects that, for example, in the case where the protrusions 27 and 30 are mutually fixed by soldering, an escape of heat at the soldering can be prevented. Further, the holes 31 and 28 are respectively formed in the protrusions 30 and 27, that is, such contrivance is made that the surface areas of the protrusions 30 and 27 are further decreased so that heat does not escape at the time of fixing the protrusions 30 and 27 by soldering.

Next, a working example of positioning and fixing the liquid crystal panel 12a of FIG. 8 at the side of the incidence plane 180 will be described.

First, the bonding portions 32a and 32b of the liquid crystal panel fixing bracket 29 are positioned to the one end plane 130 and the other end plane 140 of the synthesizing prism 14, and a UV adhesive is injected along the square holes 32c of the bonding portions 32a and 32b, so that the liquid crystal panel fixing bracket 29 is put into close contact with the incidence plane 180 and is disposed.

Next, the liquid crystal panel mounting bracket 26 is fixed to the liquid crystal panel fixing bracket 29 by, for example, soldering. That is, the protrusion 30 of the liquid crystal panel fixing bracket 29 is fixed to the protrusion 27 of the liquid crystal panel mounting bracket 26 by soldering. At this time, the surface areas of the respective protrusions 27 and 30 are small, and the holes 31 and 28 are provided to set the surface areas small, so that escape of heat at the time of soldering can be prevented. By this, the protrusions 27 and 30 can be fixed by soldering without fail and in a short time.

The protrusion 27 is formed to protrude toward the side of the liquid crystal panel fixing bracket 29, and on the contrary the protrusion 30 is formed to protrude toward the side of the liquid crystal panel mounting bracket 26. By this, when the protrusions 27 and 30 are fixed by soldering, a gap is generated between the liquid crystal panel fixing bracket 29 and the liquid crystal panel mounting bracket 26. Since the wind passes through this gap, cooling of the liquid crystal panel 12a can be effectively performed.

Figure 9:
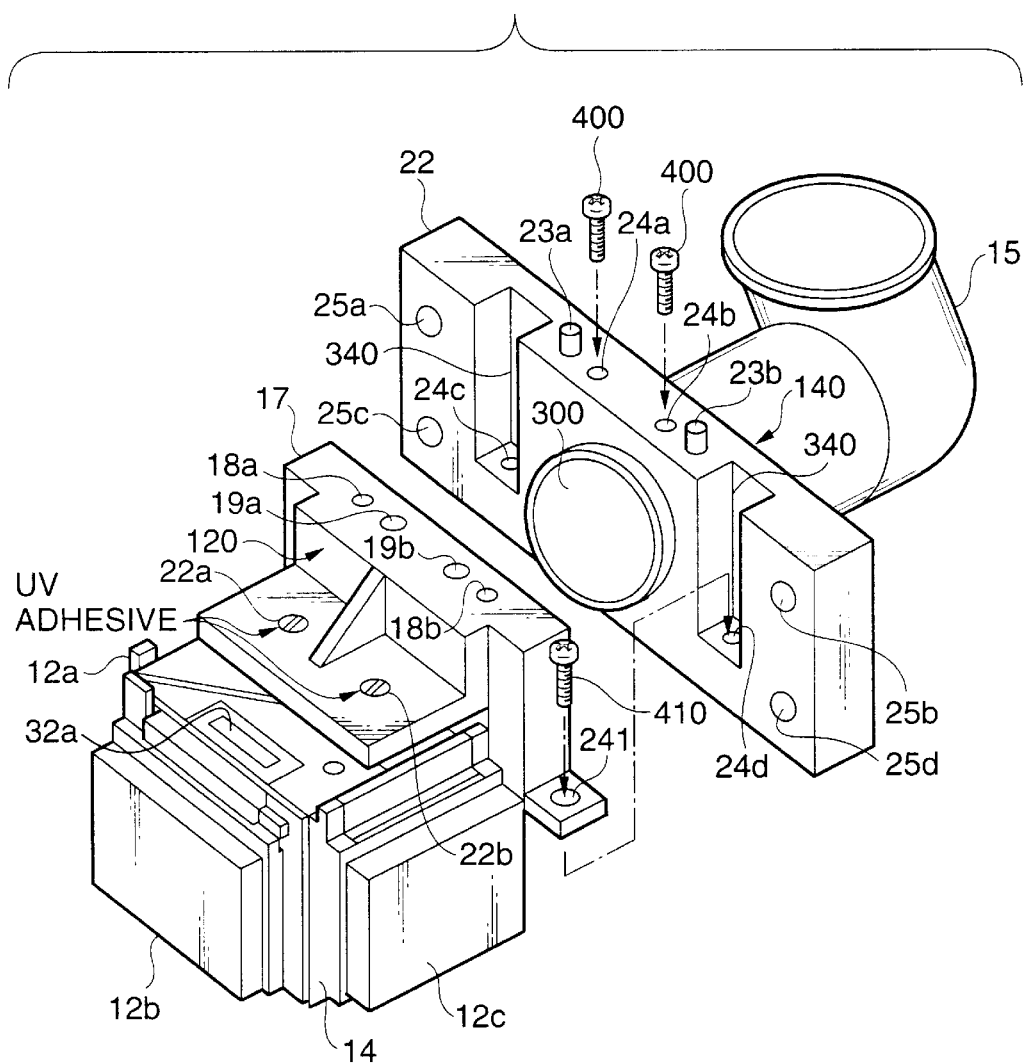
FIG. 9 is an exploded perspective view showing a structural example in which a synthesizing prism and a projection lens are positioned and fixed through a prism holder and a lens holder.

The liquid crystal panel 12a is fixed to the liquid crystal panel mounting bracket 26 by the screws 26M. An opening portion 29A of the liquid crystal panel fixing bracket 29 is set larger than the opening portion 26A of the liquid crystal panel mounting bracket 26. FIG. 8 shows an example in which the liquid crystal panel 12a is opposed to and is fixed to the incidence plane 180 of the synthesizing prism 14. This can be performed in the same manner also in the case where the liquid crystal panels 12b and 12c shown in FIG. 9 are fixed to the incidence planes 170 and 160 in FIG. 8, respectively.

Before fixing of the protrusions 27 and 30 by soldering is performed, positional adjustment of the liquid crystal panels 12a, 12b, and 12c as described below is carried out. That is, after the liquid crystal panel 12a shown in FIG. 8 is subjected to the total 6-axis adjustment of X axis direction, Y axis direction, Z axis direction, θ axis rotation direction with respect to the incidence plane 180, inclination adjustment with respect to the X axis direction, and inclination adjustment with respect to the Y axis direction, the protrusions 27 and 30 are positioned and fixed by soldering.

By this, the liquid crystal panel 12a can be subjected to accurate position adjustment with respect to the incidence plane 180, and similarly, the liquid crystal panel 12b can also be subjected to accurate position adjustment with respect to the incidence plane 170, and further, the liquid crystal panel 12c can also be subjected to accurate position adjustment with respect to the incidence plane 160, and each can be fixed.

The color magnification correcting lenses 33a, 33b and 33c are previously stuck on the incidence planes 180, 170 and 160 of the prism corresponding to red, green and blue of the synthesizing prism 14 of FIG. 8, the polarizing plates 11-1a, 11-1b, and 11-1c are stuck on the color magnification correcting lenses 33a, 33b and 33c, and further, the half-wave plates 11a, 11b and 11c are stuck thereon.

Besides, the periphery of the respective color magnification correcting lenses 33a, 33b and 33c is masked by the liquid crystal panel fixing bracket 29, so that stray light from portions other than effective planes on the incidence planes 180, 170 and 160 of the prism can be blocked.

Next, with reference to FIGS. 9 to 12, a description will be made on a structural example in which the synthesizing prism 14 assembled in the manner shown in FIG. 8, three liquid crystal panels 12a, 12b and 12c, and the projection lens 15 are optically positioned and fixed by using a prism holder 17 and a lens holder 22.

In FIG. 9, the synthesizing prism 14 is fixed by the prism holder 17, and the projection lens 15 is held in the lens holder 22. The synthesizing prism 14 shown in FIG. 9 includes the three liquid crystal panels 12a, 12b and 12c positioned and fixed in the manner shown in FIG. 8. The prism holder 17 includes a first positioning portion 120, and the lens holder 22 includes a second positioning portion 140.

Figure 10:
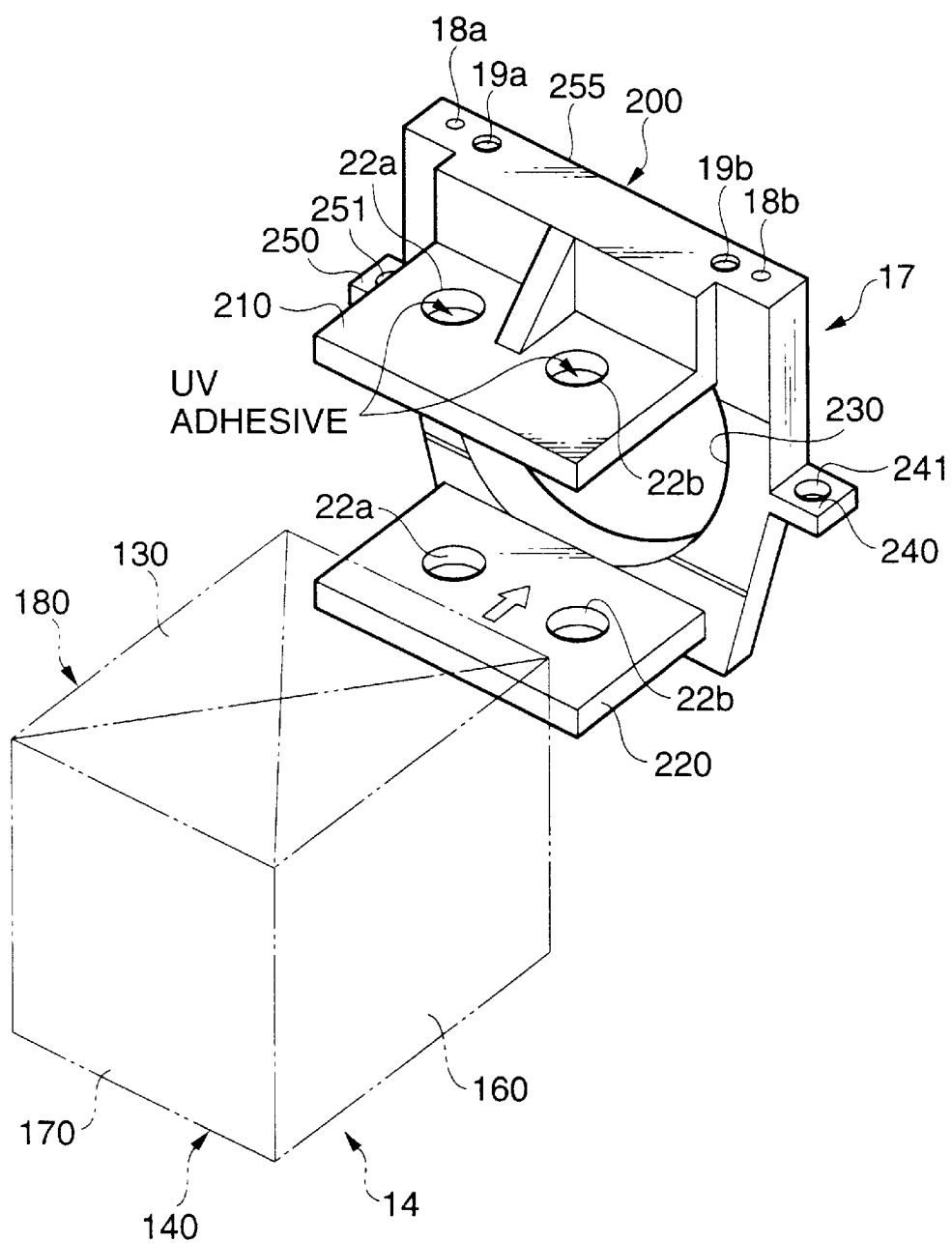
FIG. 10 is a perspective view showing an example of the prism holder of FIG. 9.
Figure 11:
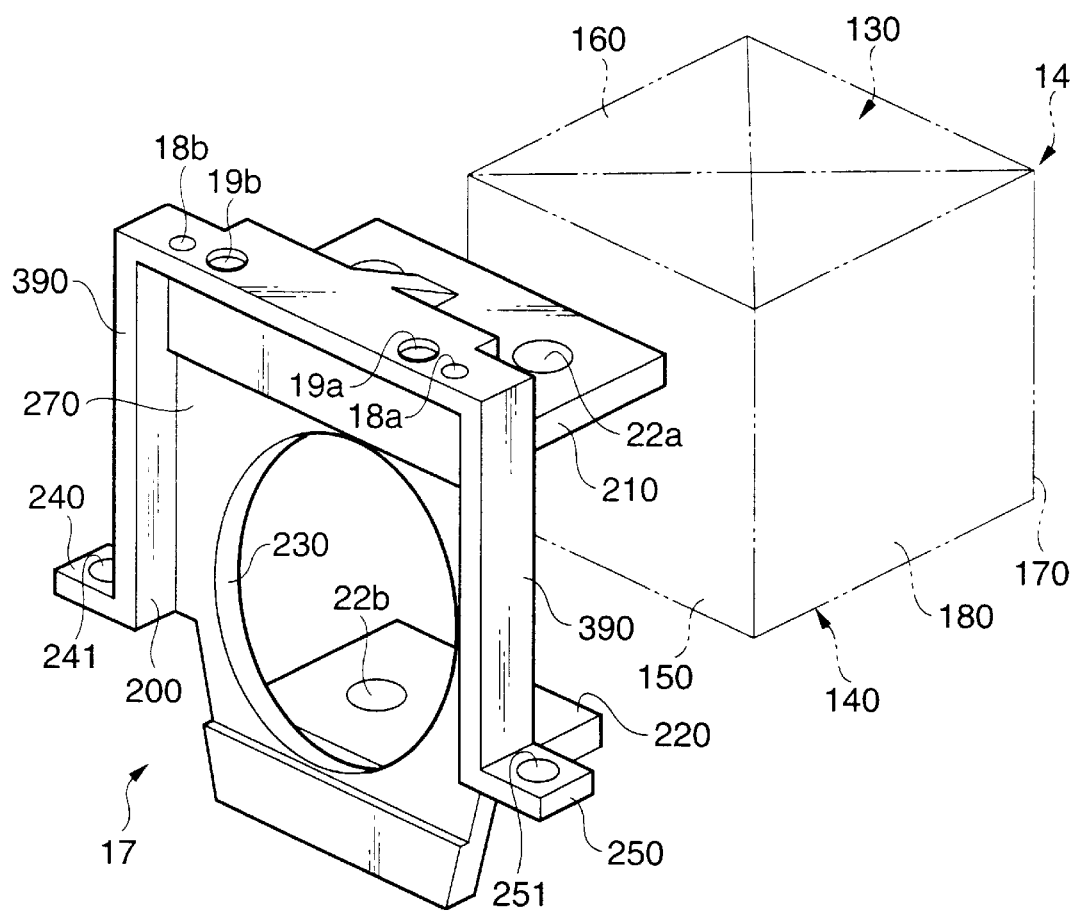
FIG. 11 is a perspective view of the prism holder seen from another plane.

The first positioning portion 120 of the prism holder 17 has a structure as shown in FIGS. 9 to 11. First, the structure of the prism holder 17 will be described. The prism holder 17 includes a base 200 and attachment portions 210 and 220. The attachment portions 210 and 220 are respectively formed to protrude perpendicularly from the base 200, and each includes holes 22a and 22b.

The attachment portions 210 and 220 are close contact portions for fixing the one end plane 130 and the other end plane 140 of the synthesizing prism 14 by adhesion. Thus, the holes 22a and 22b are holes for injecting a UV adhesive. By this, the attachment portion 210 is bonded to the one end plane 130 of the synthesizing prism 14, and the attachment portion 220 is bonded to the other end plane 140 of the synthesizing prism 14.

The base 200 includes a circular opening portion 230, and includes ear-shaped protrusions 240 and 250. The protrusions 240 and 250 include holes 241 and 251, respectively. An upper end plane 255 of the base 200 includes holder fixing holes 19a and 19b, and positioning holes 18a and 18b. As shown in FIG. 11, the rear side of the base 200 is a space portion 270 and is connected with the opening portion 230.

On the other hand, the second positioning portion 140 of the lens holder 22 has the following structure. As shown in FIG. 9, the lens holder 22 includes screw holes 25a, 25b, 25c and 25d. As shown in FIG. 12, these screw holes 25a to 25d are designed so that the lens holder 22 is fixed to the side of the housing 16 by fixing screws 290. The lens holder 22 of FIG. 9 includes an opening portion 300. The opening portion 300 is a portion coincident with the opening portion 230 of the prism holder 17 of FIG. 10. The lens holder 22 includes screw holes 24a and 24b, and include positioning pins 23a and 23b. The screw holes 24a and 24b are located at positions corresponding to the holder fixing holes 19a and 19b of the prism holder 17. The positioning pins 23a and 23b are inserted in the positioning holes 18a and 18b of the prism holder 17, so that positioning between the prism holder 17 and the lens holder 22 is carried out.

Further, the lens holder 22 includes guide grooves 340 and 340. Supports 390 and 390 of the prism holder 17 shown in FIG. 11 are inserted in the guide grooves 340 and 340. As shown in FIG. 9, holes 241 and 251 of protrusions 240 and 250 of the supports 390 and 390 fit to holes 24c and 24d of the lens holder 22, respectively.

As shown in FIG. 9, screws 400 are inserted in the holder fixing holes 19a and 19b of the prism holder 17 and the screw holes 24a and 24b of the lens holder 22, respectively, so that the prism holder 17 and the lens holder 22 can be united and fixed. At this time, since the positioning pins 23a and 23b of the lens holder 22 are inserted in the positioning holes 18a and 18b, the prism holder 17 and the lens holder 22 can be certainly positioned and fixed.

Further, positioning is made between the holes 24c and 24d of the lens holder 22 and the holes 241 and 251 of the prism holder 17, and screws 410 are inserted in the holes therebetween, so that the prism holder 17 and the lens holder 22 can be further united by the screws 410.

FIG. 12 shows a state where the lens holder 22 of the projection lens 15 and the prism holder 17 are assembled like this.

In the embodiment of the present invention, a state where the synthesizing prism 14 and the liquid crystal panels 12a, 12b and 12c are fixed to the prism holder 17, a so-called prism block is formed, so that assembling to the projection lens 15 becomes easy.

The positioning holes 18a and 18b of the prism holder 17 of the prism block are fitted to the positioning pins 23a and 23b of the projection lens holder 22, so that positioning of the synthesizing prism 14 and the projection lens 15 is made, and the optical axes of the projection lens and the prism are coincident with each other.

The exchange of the prism block can be easily made by only taking off the screws fixed to the prism fixing screw holes 24a, 24b, 24c and 24d of the lens holder 22. If prism blocks are made compatible, any prism block can be mounted.

In the embodiment of the present invention, the synthesizing prism 14 is mounted in such a manner that its upper and lower planes are held between the prism holder 17. At this time, preferably, the synthesizing prism 14 is pressed against one plane of the prism holder 17 at the upper side and at the projection lens 15 side, the two planes are base positioned, further, positioning is made using an adjustment jig with laser beam so that the right and left center of the prism coincides with the light axis of the projection lens 15, and when positioning is completed, ultraviolet ray curing resin (UV) is poured into the adhesion fixing holes 22a and 22b, and is cured by light to make adhesive bonding.

The liquid crystal panel fixing brackets (members) 29 shown in FIG. 8 are bonded to the three planes of the cross dichroic prism 14 in such a manner that positioning is made using a jig to fasten the prism, ultraviolet ray curing resin is poured in the square hole 32c for UV adhesion, and is cured by light to make adhesive bonding.

The merit of fixing the synthesizing prism 14 by using the upper and lower planes of the synthesizing prism 14 as described above is that since the adhesion plane of the prism is suitably roughened, adhesive bonding is excellently made. Besides, curing can be made by irradiation of light from one direction at the time of curing. Further, it is possible to mention such merits that there is no fear that an adhesive sticks out to the prism plane.

Besides, since the state where three liquid crystal panels are fixed to the synthesizing prism, that is, the prism block is formed, in the case where defects of a liquid crystal panel occur, service can be easily made by exchanging only the prism block.

The embodiment of the present invention has such structure that the members (liquid crystal mounting bracket, liquid crystal fixing bracket) are bonded to the upper and lower planes of the cross dichroic prism, and further, the liquid crystal panel is fixed through the members by soldering or adhesive, and the prism holder is bonded by using the upper and lower planes of the cross dichroic prism. Thus, the following merits are obtained.

Positioning of the liquid crystal panel can be made with accuracy, and it is possible to obtain high image quality with little color deviation of three colors of red, green and blue.

Since a simple stage conventionally used can be omitted, it is possible to reduce the number of parts and to reduce the cost.

The liquid crystal panel is fixed to the side of the synthesizing prism by soldering or ultraviolet ray curing resin, so that registration (position) deviation by falling, shock, or the like can be eliminated.

The member is bonded to the upper and lower planes of the synthesizing prism, and the liquid crystal panel is fixed through the member by soldering or adhesive, so that the prism block can be made small. Further, the whole of the optical unit can be made small.

Since parts such as a simple stage are eliminated from the periphery of the prism, a space can be formed between the liquid crystal panel and the polarizing plate, so that the liquid crystal panel and the polarizing plate can be effectively cooled.

When the members are bonded to the upper and lower planes of the cross dichroic prism, since ultraviolet rays are irradiated in one direction to make curing, work efficiency is excellent.

In the case where a defect occurs in the liquid crystal panel, the exchange of the prism block can be easily made. Since the prism block is directly fixed to the projection lens holder, assembling can be made with accuracy.

Although the embodiment has been described in detail, the present invention is not limited to the three-plate type projection apparatus, but can also be applied to another projection apparatus.

As described above, according to the present invention, although a simple structure is adopted, assembling can be made with accuracy and without fail while positioning of an optical modulation element, and a synthesizing prism and a projection lens is made.

What is claimed is:

1. A projection apparatus comprising:

a light source;

separation optical means for color separating a light beam from the light source into a plurality of color light beams;

a plurality of transmission type optical modulation elements for modulating the separated color light beams;

synthesis optical means for generating a light flux by synthesizing the respective color light beams modulated by the optical modulation elements; and projection optical means for projecting the synthesized light flux, wherein the projection apparatus further comprises:

a prism holder for holding a synthesizing prism as the synthesis optical means, the prism holder including a first positioning portion, and being positioned and fixed to one end plane and the other end plane of the synthesizing prism opposite to each other, except for incidence planes of the synthesizing prism on which the respective color light beams are incident and an outgoing plane of the synthesizing prism for outputting the synthesized light flux to the side of the projection optical means, and a lens holder for holding the prism holder and a projection lens as the projection optical means, the lens holder including a second positioning portion which is fitted to the first positioning portion of the prism holder to make positioning and fixing.

2. A projection apparatus according to claim 1, wherein the prism holder includes attachment portions protruding to pinch the one end plane and the other end plane of the synthesizing prism, and a hole for injection of an adhesive is provided in the attachment portion.

3. A projection apparatus according to claim 1, wherein the first positioning portion of the prism holder includes a positioning hole, the second positioning portion of the lens holder includes a positioning pin which is inserted in the positioning hole to position the prism holder with respect to the lens holder, and the lens holder and the prism holder are fixed by screwing after positioning.

4. A projection apparatus according to claim 3, wherein the prism holder is detachably screwed to the lens holder.

5. A projection apparatus according to claim 3, wherein the lens holder is mounted to a housing of the projection apparatus in a state where the prism holder is mounted to the lens holder.

6. A projection apparatus according to claim 1, further comprising:

a first fixing member which is disposed opposite to one of the three incidence planes on which the color light beams of the synthesizing prism are incident, is bonded to the one end plane and the other end plane of the synthesizing prism, and includes an opening portion through which the color light beams modulated by the optical modulation element pass, and a plurality of ear-shaped protrusions; and a second fixing member which is put into close contact with and is fixed to the first fixing member so that the optical modulation element is fixed to a side of the synthesizing prism, includes an opening portion through which the color light beams modulated by the optical modulation element pass, and a plurality of ear-shaped protrusions, wherein the protrusions of the first fixing member and the protrusions of the second fixing member are fixed by bonding or soldering in a state where the three optical modulation elements are respectively positioned to the three incidence planes of the synthesizing prism on which the color light beams are incident so that the color light beams form the light flux synthesized by the synthesizing prism.

7. A projection apparatus according to claim 6, wherein the adhesive is a photo-curing adhesive.

8. A projection apparatus according to claim 6, wherein the optical modulation element is a transmission type liquid crystal element.

9. A projection apparatus according to claim 6, wherein the plurality of the ear-shaped protrusions of the first fixing member is equal to that of the second fixing member, the corresponding ear-shaped protrusions are fixed by an adhesive or soldering, and air for cooling is made to flow between the first fixing member and the second fixing member.

10. A projection apparatus according to claim 6, wherein a hole is provided at a root of each of the plurality of ear-shaped protrusions, which are provided to the first fixing member, with respect to a main body of the first fixing member to increase thermal resistivity.

11. A projection apparatus according to claim 6, wherein a hole is provided at a root of each of the plurality of ear-shaped protrusions, which are provided to the second fixing member, with respect to a main body of the second fixing member to increase thermal resistivity.

12. A projection apparatus according to claim 6, wherein the first fixing member includes folded portions bonded to the one end plane and the other end plane of the synthesizing prism, and a hole portion for injection of an adhesive and fixing is provided in the folded portions.

13. A projection apparatus according to claim 6, wherein a periphery of the opening portion of the second fixing member blocks stray light incident on the incidence planes of the synthesizing prism.

* * * * *